Feb. 13, 1951 A. E. VIOLET 2,541,128

MULTIPLE FREQUENCY AUTOMATIC TUNING DEVICE

Filed Nov. 18, 1948 2 Sheets-Sheet 1

INVENTOR
ANDRÉ E. VIOLET
BY [signature]
ATTORNEY

Feb. 13, 1951 A. E. VIOLET 2,541,128

MULTIPLE FREQUENCY AUTOMATIC TUNING DEVICE

Filed Nov. 18, 1948 2 Sheets-Sheet 2

INVENTOR
ANDRE E. VIOLET
BY R P Morris
ATTORNEY

Patented Feb. 13, 1951

2,541,128

UNITED STATES PATENT OFFICE 2,541,128

MULTIPLE FREQUENCY AUTOMATIC TUNING DEVICE

André Emile Violet, Boulogne-Billancourt, France, assignor to International Standard Electric Corporation, New York, N. Y., a corporation of Delaware Application November 18, 1948, Serial No. 60,681
In France November 21, 1947

4 Claims. (Cl. 178—66)

The present invention relates to automatic tuning devices and more particularly to such devices used in radio receivers of the super-heterodyne type, for example, in the case of carrier shift telegraph signals.

In the case of frequency modulated telegraph signals, a continuous wave is successively transmitted at two different frequencies, one of which corresponding to the marking position and the other one to the spacing condition. In this type of transmission it is of the greatest importance that the receiver be properly stabilised and that the tuning be exact otherwise the signals, when they are detected by a discriminator, may comprise a large D. C. component which may prevent the correct operation of the amplifier tube which follows the discriminator.

It is possible to overcome this difficulty by eliminating the D. C. component by means of a condenser, but in this case the stability of operation is impaired when the transmitter remains for some time on its spacing or rest position, small accidental impulses are then sufficient for operating the telegraph relay.

It is also possible to use the D. C. component of the discriminator to react on the frequency of the local tuning oscillator by means, for instance, of a reactance tube or variable impedance tube for controlling the rotation of a motor driving a variable condenser for retuning the receiving. In practice, the potential supplied by the discriminator varies continuously between two potentials corresponding to the marking and spacing frequencies and it is not possible to have a stable operation. In particular a long spacing signal has the effect of completely upsetting the operation of the oscillator.

One object of the present invention is to provide an automatic tuning control device for frequency modulation receivers, which ensures complete stability of operation.

According to one feature of the invention, two discriminators are used, respectively tuned on the frequency of spacing and marking position. The D. C. potentials from these discriminators are added and constitute the control potential of the automatic control arrangement.

Figure 3:
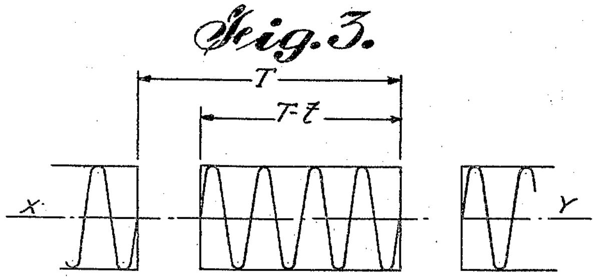
Figure 4:
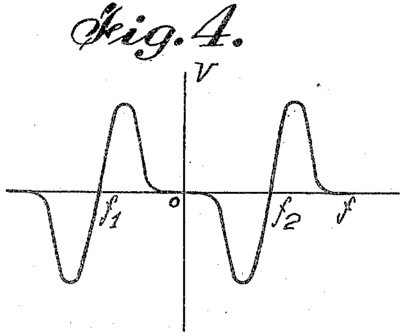
Figure 5:
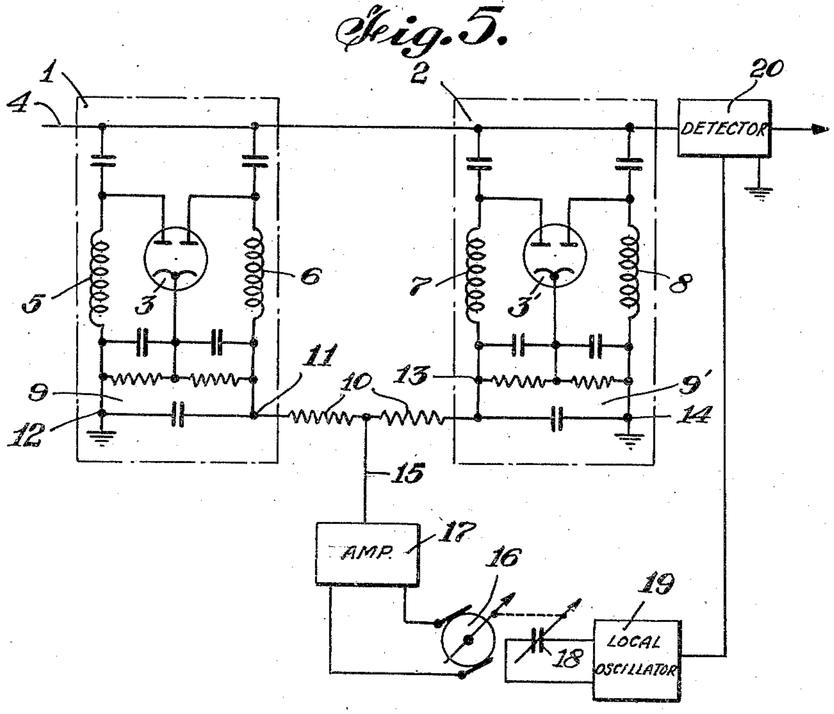
Figure 6:
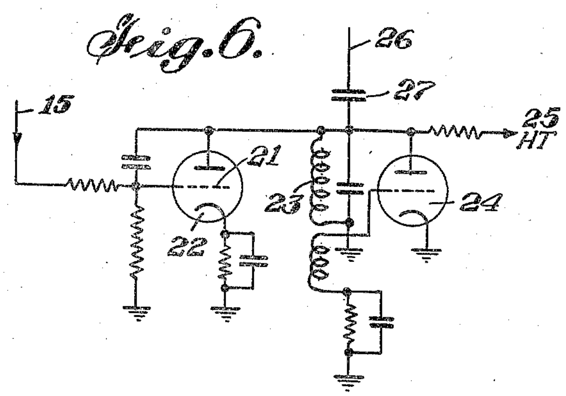

The above and other features and objects of this invention will become more apparent, and the invention itself, though not necessarly defined by said features and object, will be best understood by reference to the following description of an embodiment of the invention taken in conjunction with the accompanying drawings wherein:

Figs. 1, 2, 3, and 4 are diagrams useful for the understanding of the invention, and Figs. 5 and 6 show schematically preferred embodiments of the invention.

Figure 1:
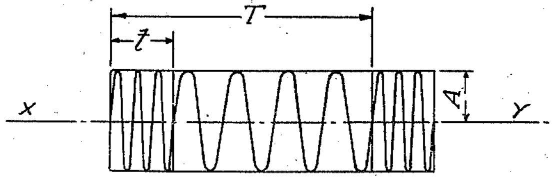
Figure 2:
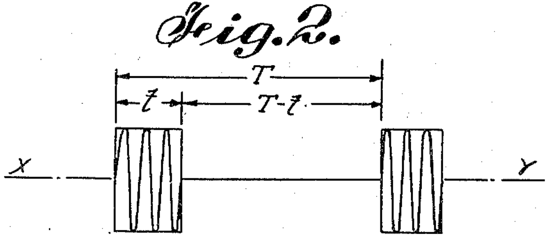

Referring to the drawings, Figs. 1, 2 and 3 represent an incoming wave of constant amplitude and in which the time is given in the abcissa along axis $xy$.

Let us consider a wave which, within a time interval T, passes from a frequency $f_1$ transmitted during a time interval $t$, to a frequency $f_2$ transmitted during a time interval $T—t$.

If this wave is considered as a signal wave frequency modulated by rectangular shaped signals, its analysis in the frequency spectrum rapidly becomes impossible, but it may be considered as the result of the superimposition of two waves which are amplitude modulated by a rectangular signal. One of these waves has a frequency $f_1$ and a duration $t$ (Fig. 2), the other one a frequency $f_2$ and a duration $T—t$ (Fig. 3).

If the incoming wave is represented in this way, it may be seen that there is no reason why one should obtain a wave with a frequency equal to the mean arithmetical value of the component frequencies $f_1$ and $f_2$; it also follows that at least one wave of frequency $f_1$ or $f_2$, and generally two waves of frequencies $f_1$ and $f_2$ are obtained, which will be called "secondary carrier waves." On the other hand the side bands (not shown on the diagram) relating to each secondary carrier wave are symmetrical with respect to each "secondary carrier wave."

Applicant has found that automatic control of the tuning can be effected by means of two discriminators tuned respectively on each carrier wave. These discriminators must be sufficiently selective to avoid over-lapping of the characteristic potential curves in function of the frequency. Fig. 4 shows the response curve of such an arrangement. The output potential is given in ordinates OV and the frequency in abscissa $Of$. The left hand side of the graph shows the characteristic curve of the first discriminator tuned to frequency $f_1$ and the right hand side of the graph the characteristic of the second discriminator tuned to frequency $f_2$. It is seen that the detected potentials supplied by the discriminators are not superimposed if their selectivity is sufficiently high.

Fig. 5 shows by way of example a preferred embodiment of an automatic control device incorporating features of the invention. This device comprises two conventional discriminators 1 and 2. Each of these discriminators 1 and 2 comprises two rectifiers such as 3 and 3' which may be double diode vacuum tubes or dry rectifiers.

The received signals are amplified to an appropriate level (by amplifiers not shown) and applied to conductor 4. The plates of vacuum tube 3 of the first discriminator are respectively connected to one end of the tuned circuits 5 and 6. The resonant circuit 5 is tuned to a frequency slightly below the nominal receiving frequency $f_1$ of the first discriminator $(f_1-\epsilon_1)$ and the second resonant circuit 6 is tuned to a frequency slightly above this same nominal frequency $f_1$ $(f_1+\epsilon_1)$.

The second discriminator 2 is similar to the first one and also comprises two resonating circuits 7 and 8 coupled to tube 3' and respectively tuned above and below the nominal receiving frequency $f_2$, i. e. $(f_2-\epsilon_2)$ and $(f_2+\epsilon_2)$.

Low pass filters 9 and 9' with relatively high time constants are connected in the output of the discriminators to eliminate the high frequency current, and resistances 10 having high values are connected in the output circuit of discriminators 1 and 2.

Discriminator 1 is tuned to frequencies $(f_1-\epsilon_1)$ and $(f_1+\epsilon_1)$ delivers between terminal 11 and the ground 12 a D. C. potential $V_1$, whose amplitude depends on the difference between the tuning frequency $f_1$ of the discriminator and the secondary carrier $F_1$ of the transmitter at the time. In the same manner, the discriminator 2, whose tuning frequencies are $(f_2-\epsilon_2)$ for the resonating circuit 7 and $(f_2+\epsilon_2)$ for resonating circuit 8 delivers between terminal 13 and the ground 14 a D. C. potential $V_2$ whose amplitude also depends on the difference between the tuning frequency $f_2$ of discriminator 2 and the secondary carrier wave $F_2$ of the transmitter at that time. This difference in tuning is substantially the same as that between $f_1$ and $F_1$ if the difference between the tuning of the two discriminators corresponds to the difference in the transmitted frequency. These two potentials are partly added and the resulting potential has an amplitude $$V=\frac{V_1+V_2}{2}$$

which is collected at point 15. This amplitude V depends only slightly on $t$ and $T-t$. It remains the same even if the transmitted wave remains indefinitely equal to $F_1$ or $F_2$, and the automatic tuning circuit is not affected by long continuous transmission of the marking or spacing signals.

This potential may be used to operate for instance a motor 16 by means of a device 17 which may comprise vacuum tubes.

The motor may drive the mobile plates of a tuning condenser 18 in such a way as to retune the circuit on the carrier wave. The condenser 18 is connected to the local oscillator 19 of the receiver shown in block form. The local oscillator is coupled to detector 20 shown in block form.

Fig. 6 shows another tuning device. In this case the potential from lead 15 of Fig. 5 is applied to the grid 21 of a variable reactance vacuum tube 22. The reactance of this tube varies according to the potential applied to its grid 21, and alters the tuning of the resonating circuit 23.

The vacuum tube 24 operates as a conventional oscillator. The high potential is applied in 25 to the anodes of tubes 22 and 24. The oscillations are transmitted at 26 to the frequency changer stage of the receiver (not shown) by means of a condenser 27. The connection is made in such a way that the voltage fluctuations from 15 result in a corresponding drift in the receiver frequency to adjust it on the frequency of the receiver.

While I have described a particular embodiment of my invention for purposes of illustration it should be understood that various modifications and adaptations thereof may be made within the spirit of the invention as set forth in the appended claims.

What is claimed is:

1. Signal receiving means for successively receiving two different frequencies comprising tuning means resonant at said frequencies, a first discriminator tuned to frequencies lying either side of the operating range of the first of said different frequencies, a second discriminator tuned to frequencies lying either side of the operating range of the other of the second of said different frequencies, means to combine the output of said discriminators and means to apply the combined output of said discriminators to said tuning means whereby said receiving means is automatically kept substantially in resonance with said two different frequencies.

2. Signal receiving means as claimed in claim 1, wherein said first discriminator comprises a full-wave rectifier device, a first pair of resonant circuits respectively coupled to different halves of said device, each of said circuits adapted to resonate respectively at frequencies above and below the operating range of one of said different frequencies, said second discriminator comprises a full-wave rectifier device, a second pair of resonant circuits respectively coupled to different halves of said second device, each of said last-named circuits adapted to resonate respectively at frequencies above and below the operating range of the other of said different frequencies, a pair of low pass filters having a relatively high time-constant, each connected across a different one of said discriminators, and said means to combine the output of said discriminators comprises a pair of resistances serially connected between each other and the output of each of said filters, whereby a voltage may be derived at the junction point of said resistances.

3. Signal receiving means as claimed in claim 1 wherein said tuning means comprises a variable condenser and a reversible electric motor coupled to the shaft of said condenser, said motor connected to said output combining means, whereby said motor is driven in either direction in accordance with the potentials derived from said combining means.

4. Signal receiving means as claimed in claim 1, wherein said tuning means comprises a local heterodyne oscillator, said oscillator having a tuning resonating circuit, a variable reactance electron discharge tube in shunt with said tank, said tube having a control electrode, a cathode and an anode, the control grid of said tube connected to said output combining means, whereby the reactance of said resonating circuit is varied in accordance with the potentials derived from said combining means.

ANDRÉ EMILE VIOLET.

REFERENCES CITED

The following references are of record in the file of this patent:

UNITED STATES PATENTS

| Number | Name | Date |
|---|---|---|
| 2,147,509 | Wilkens | Feb. 14, 1939 |
| 2,393,400 | Noviks et al. | Jan. 22, 1946 |